(12) United States Patent
Williams et al.

(10) Patent No.: US 6,182,108 B1
(45) Date of Patent: *Jan. 30, 2001

(54) METHOD AND SYSTEM FOR MULTI-THREADED PROCESSING

(75) Inventors: Antonty S. Williams, Mercer Island; Alexander A. Mitchell, Redmond; Robert G. Atkinson, Woodinville; C. Douglas Hodges, Redmond; Johann Posch; Craig H. Wittenberg, both of Mercer Island, all of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/381,635

(22) Filed: Jan. 31, 1995

(51) Int. Cl.$^7$ .................................................. G06F 9/00
(52) U.S. Cl. ........................... 709/102; 709/315; 709/330
(58) Field of Search ..................... 395/650, 700, 395/800; 364/131–134; 700/2–9; 709/304, 100–102, 106, 219, 303, 217, 312–315, 330, 107; 707/8

(56) References Cited

U.S. PATENT DOCUMENTS

| 4,553,202 | 11/1985 | Trufyn ................................. 395/742 |
| 4,809,168 | 2/1989 | Hennessy et al. .................... 395/674 |

(List continued on next page.)

OTHER PUBLICATIONS

Abadi, M. et al., "A Calculus for Access Control in Distributed Systems," Feb. 1991, revised Aug. 1991, pp. iii–viii and 1–44 pages.

Abadi, Martin, "Baby Modula–3 and a Theory of Objects," SRC Research Report, Feb. 1993; revised Dec. 1992, iii–iv and 1–36.

Birrell, A. D. et al., "Synchronization Primitives for a Multiprocessor: A Formal Specification," SRC Research Report, Aug. 1987, pp. i–iii and 1–20.

Birrell, Andrew D., "An Introduction to Programming with Threads," SRC Research Report, Jan. 1989, pp. 1–33.

Broy, Manfred et al., "Can Fair Choice be Added to Dijkstra's Calculus?", SRC Research Report, Feb. 1989, pp. 1–17.

(List continued on next page.)

*Primary Examiner*—William Grant
*Assistant Examiner*—Steven R. Garland
(74) *Attorney, Agent, or Firm*—Klarquist Sparkman Campbell Leigh & Whinston, LLP

(57) ABSTRACT

The present invention provides a method and system for multi-threaded processing that is an improvement over conventional systems. The system of the present invention comprises multiple threads of execution, multiple apartments, shared data, and a concurrency management component. The threads of execution run independently and each occupy one apartment. The apartments contain objects that have methods to perform operations. The shared data contains data that is accessible by all threads within the process. The concurrency management mechanism performs processing so that the multiple threads can execute concurrently in a reliable and robust manner. In an alternative system of the present invention, the threads are separate from the apartments and the threads execute within the apartments to perform processing. After performing the processing, the thread exits the apartment so that the apartment may be occupied by another thread.

27 Claims, 15 Drawing Sheets

U.S. PATENT DOCUMENTS

| | | | |
|---|---|---|---|
| 4,847,751 | 7/1989 | Nakade et al. | 395/677 |
| 5,095,421 | 3/1992 | Freund | 395/671 |
| 5,175,852 | 12/1992 | Johnson et al. | 395/608 |
| 5,179,702 | 1/1993 | Spix et al. | 395/650 |
| 5,210,874 | 5/1993 | Karger | 395/684 |
| 5,218,699 | 6/1993 | Brandle et al. | 395/684 |
| 5,274,809 | 12/1993 | Iwasaki et al. | 395/674 |
| 5,305,455 | 4/1994 | Anschuetz et al. | 395/670 |
| 5,319,782 | 6/1994 | Goldberg et al. | 395/674 |
| 5,339,415 | 8/1994 | Strout, II et al. | 395/650 |
| 5,421,013 | 5/1995 | Smith | 395/677 |
| 5,463,625 | 10/1995 | Yasrebi | 395/650 |
| 5,515,492 | 5/1996 | Li et al. | 395/329 |
| 5,560,029 * | 9/1996 | Papadopoulous et al. | 395/800 |
| 5,561,797 | 10/1996 | Gilles et al. | 395/608 |
| 5,675,796 * | 10/1997 | Hodges et al. | 709/100 |
| 5,684,993 * | 11/1997 | Willman | 709/107 |
| 5,692,193 * | 11/1997 | Jagannathan et al. | 709/106 |
| 5,787,281 * | 7/1998 | Schreiber et al. | 709/304 |

OTHER PUBLICATIONS

Burstall, R. et al., "A Kernel Language for Modules and Abstract Data Types," SRC Research Report, Sep. 1984, pp. 2–51.

Cardelli, Luca, "A Polymorphic lambda–calculus with Type: Type," SRC Research Report, May 1986, pp. 1–27.

Cardelli, Luca et al., "Modula–3 Report (revised)," SRC Research Report, Nov. 1989, pp. 1–71.

DeTreville, John, "Experience with Concurrent Garbage Collectors for Modula–2+," SRC Research Report, Nov. 1990, pp. 1–54.

Ellis, John R. et al., "Real–time Concurrent Collection on Stock Multiprocessors," SRC Research Report, Feb. 1988, pp. 1–24.

Horning, Jim et al., "Some Useful Modula–3 Interfaces," SRC Research Report, Dec. 1993, pp. iii–vii and 1–103.

Lamport, Leslie, "A Fast Mutual Exclusion Algorithm," SRC Research Report, Nov. 1985, revised Oct. 1986, pp. iii and 1–12.

Lamport, Leslie, "A Simple Approach to Specifiying Concurrent Systems," SRC Research Report, Dec. 1986, revised Jan. 1988, corrected Aug. 1988, pp. iii–viii and 1–39.

Lamport, Leslie, "Concurrent Reading and Writing of Clocks," SRC Research Report, Apr. 1988, revised Nov. 1990, pp. iii–vi and 1–7.

Lamport, Leslie, "How to Make a Correct Multiprocess Program Execute Correctly on a Multiprocessor," SRC Research Report, Feb. 1993, pp. iii–vii and 1–10.

Lamport, Leslie, "On Interprocess Communication," SRC Research Report, Dec. 1985, pp. iii–viii and 1–50.

Lamport, Leslie, "win and sin: Predicated Transformers for Currency," SRC Research Report, May 1987, revised Dec. 1989, pp. iii–ix and 1–43.

McJones, Paul R. et al. "Evolving the UNIX System Interface to Support Multithreaded Programs," SRC Research Report, Sep. 1987 (reformatted for electronic distribution Aug. 1997), pp. 1–80.

Nelson, Greg, "A Generalization of Dijkstra's Calculus," SRC Research Report, Apr. 1987, pp. 1–56.

Owicki, Susan, "Experience with the Firefly Multiprocessor Workstation," SRC Research Report, Sep. 1989, pp. 1–17.

Roberts, Eric S. et al., "WorkCrews: An Abstraction for Controlling Parallelism," SRC Research Report, Apr. 1989, pp. 1–17.

Rovner, Paul et al., "On Extending Modula–2 For Building Large, Integrated Systems," SRC Research Report, Jan. 1985, pp. 1–45.

Schroeder, Michael D. et al., "Performance of Firefly RPC," Apr. 1989, pp. 1–15.

Thacker, Charles P. et al. "Firefly: A Multiprocessor Workstation," SRC Research Report, Dec. 1987, pp. 1–17.

Microsoft OLE 2.0 Design Team, *Object Linking & Embedding: OLE 2.0 Design Specification,* Microsoft Corporation, 1992–1993, pp. 2–4 and Chapter 11.

Brookes, Stephen D., *On the Relationship of CCS and CSP,* Department of Computer Science, Carnegie–Mellon University, Mar. 1983, 20 pages.

van Glabbeek, R.J., Notes on the Methodology of CCS and CSP, Stanford Technical Report, 21 pages, 1983.

Kimura, Shigetomo and Shoichi Noguchi, *Synthesis of Algebraic Processes Based on Process Enumeration,* Systems and Computers in Japan, vol. 24, No. 13, 1993, pp. 1–15.

Aczel, Peter, "Final Universes of Processes," *Mathematical Foundations of Programming Semantics, 9th Int'l. Conference,* New Orleans, LA, Apr. 7–10, 1993, Springer–Verlag, Berlin, Germany, 28 pages.

Meyer, Albert R., "Observing Truly Concurrent Processes," *Proceedings of the Int'l. Symposium TACS '94,* Sendai, Japan, Apr. 19–22, 1994, Springer–Verlag, Berlin, Germany, abstract.

Baeten, J.C.M. and C. Verhoef, *A Congruence Theorem for Structured Operational Semantics with Predicates,* Eindhoven University of Technology (Netherlands), Dept. of Mathematics and Computing Science, 1993, pp. 477–492.

Bloom, Bard et al., *Bisimulation Can't be Traced: Preliminary Report,* Laboratory for Computer Science, Massachusetts Institute of Technology, 1987, pp. 1–21.

Hoare, C.A.R., *Communicating Sequential Processes,* Prentice/Hall International, May 1985, Chapters 1, 2, 5, 6, and 7.

Taubner, Dirk, *Finite Representations of CCS and TCSP Programs by Automata and Petri Nets,* Lecture Notes in Computer Science, vol. 369, Springer Verlag, Berlin, 1989, 158 pages.

Milner, Robin, *A Calculus of Communicating Systems,* Lecture Notes in Computer Science, vol. 92, Springer–Verlag, Oct. 1980, Chapters 1–7.

Peterson, James L., "The Mach Kernel," *Proceedings, Share Europe Spring Meeting: Managing Communications in a Global Marketplace,* Cannes, France, Share Europe, Geneva, Switzerland, Mar. 30–Apr. 3, 1992, pp. 571–578.

Nakajima, Tatsuo et al., "Integrated Management of Priority Inversion in Real–Time Mach," *Proceedings, Real–Time Systems Symposium 1993,* IEEE, Piscataway, NJ 1993, pp. 120–130.

Black, David L., *Scheduling Support for Concurrency and Parallelism in the Mach Operating System,* School of Computer Science, Carnegie Mellon University, Pittsburgh, PA, Apr. 1990, 16 pages.

Cheriton, David R., *The Thoth System: Multi–Process Structuring and Portability,* Elsevier Science Publishing Co., Inc., New York, 1982, Chapters 1–5.

Cheriton, David R., *Multi–Process Structuring and the Thoth Operating System,* Computer Science Department, University of Waterloo, May 1979, 90 pages.

Fuggetta, Alfonso et al., *Some Consideration on Real–Time Behavior of Concurrent Programs,* IEEE Transactions on Software Engineering, vol. 15, No. 3, Mar. 1989, pp. 356–359.

Jones, Michael B and Richard F. Rashid, "Mach and Matchmaker: Kernel and Language Support for Object–Oriented Distributed Systems," *in OOPSLA '86 Proceedings,* Assoc. for Computing Machinery, Portland, Oregon, Sep. 29–Oct. 2, 1986, pp. 67–77.

Accetta, Mike et al., "Mach: A New Kernel Foundation for Unix Development," in *Summer Conference Proceedings,* USENIX Assoc., Jun. 9–13, 1986, Atlanta, Georgia, pp. 93–112.

Rashid, Richard F., "From RIG to Accent to Mach: The Evolution of a Network Operating System," in *1986 Proceedings of the Fall Joint Computer Conference,* ACM and Computer Society of the IEEE, Nov. 2–6, 1986, pp. 1128–1137.

Sansom, Robert D. et al, "Extending a Capability Based System into a Network Environment" in *Communications Architecture & Protocols '86 Symposium,* ACM SIGCOMM, Aug. 5, 6, and 7, 1986, pp. 265–274.

* cited by examiner

METHOD AND SYSTEM FOR MULTI-THREADED PROCESSING

TECHNICAL FIELD OF THE INVENTION

The present invention relates generally to data processing systems and, more particularly, to multi-threaded processing within a data processing system.

BACKGROUND OF THE INVENTION

A computer program that has been loaded into memory and prepared for execution is called a "process." A process comprises the code, data, and other resources, such as files, that belong to the computer program. Each process in a data processing system has at least one thread which is known as the main thread. A thread comprises a pointer to a set of instructions, related central processing unit (CPU) register values, and a stack. A process can have more than one thread with each thread executing independently and keeping its own stack and register values. When a process has more than one thread, the process is said to be multi-threaded.

When a process performs multi-threaded processing, the threads can each perform a discrete unit of functionality. One advantage to multi-threaded processing is that threads can transfer information back and forth without having to cross process boundaries, which is expensive in terms of CPU processing time. Another advantage of multi-threaded processing is that when transferring data between threads of a single process, a reference to the data can be transferred instead of a copy of the data. Otherwise, if each discrete unit of functionality were implemented as a process, the data would typically have to be copied before being transferred to the destination process and this requires a significant amount of CPU processing time.

Two models used for performing multi-threaded processing by conventional systems are the free threading model and the lightweight process model.

As shown in FIG. 1, the free threading model comprises a process 100 containing a number of objects 104, 108, 112, 116 and shared data 102. The term "object" refers to a combination of code ("Methods") and data. The code of the object typically acts upon the data of the object. The shared data 102 is data that can be accessed by any object within the process 100. Each object in the free threading model has a lock 106, 110, 114, 118. The locks 106, 110, 114, 118 on the objects 104, 108, 112, 116 serialize access to each object so as to prevent contention problems. The shared data 102 has a semaphore 103 that serializes access to the shared data. In the free threading model, there are multiple threads and each thread can access any object 104, 108, 112, 116. Thus, the locks 106, 110, 114, 118 are necessary to prevent contention problems that may arise when more than one thread attempts to access an object.

One problem with the free threading model is that it is difficult to provide concurrency management within the free threading model. The term "concurrency management" in this context refers to managing the objects so that each object may concurrently execute in a reliable and robust manner. Providing concurrency management is difficult since a lock must be implemented for each object. In addition, the implementation of each lock is further complicated since each lock must play a part in preventing process-wide deadlock. "Deadlock," in this context, refers to when two or more objects are blocked while waiting on each other to perform an operation. For example, if a first object is blocked while waiting to invoke a method on a second object and the second object, in turn, is blocked while waiting to invoke a method on a first object, each object is waiting on the other and therefore deadlock has occurred. Since each object must have a lock, additional code is necessary for each object and this code must be developed and tested. Further, if an object is created and inadvertently a lock is not put on the object, the object and the process can behave in an undesirable manner. A second problem with the free threading model occurs when more than one object within a process is performing user interface operations. This problem arises because when an object is performing an operation on a portion of the user interface such as a window, the window is usually locked. Consequently, if a second object then tries to perform an operation on the window while the window is locked, the second object will receive an error and will not be able to perform the operation. Thus, it is difficult to perform user interface operations with the free threading model.

FIG. 2 depicts a diagram of the lightweight process ("LWP") model for performing multi-threaded processing. In the LWP model, a process 200 contains a number of lightweight processes 202, 204, 206. Each lightweight process executes independently and contains procedures, data and variables. Therefore, a lightweight process is very similar to a thread. In the LWP model, each lightweight process can perform a discrete unit of functionality and can thus take advantage of the benefits of multi-threaded processing. However, the LWP model does not provide shared data and therefore when one lightweight process wants to communicate to another lightweight process, the data is typically copied before it can be sent. Performing a copy of the data before sending the data requires a significant amount of CPU processing time. In addition, since there is no shared data, data that all lightweight processes would like to access has to be maintained by a lightweight process. Such information includes location information for the procedures in the lightweight processes. Therefore, for example, whenever a lightweight process wants to determine the location of a procedure so that it may invoke the procedure, the lightweight process must communicate to the lightweight process that maintains the location information. This communication is costly in terms of CPU processing time.

SUMMARY OF THE INVENTION

In accordance with a first aspect of the present invention, a method is executed in a computer system having a process with address space and a plurality of threads within the address space. In accordance with this method of the first aspect of the present invention, each thread is a path of execution and has a communication mechanism. In addition, the communication mechanism has a concurrency management component. This method of the first aspect of the present invention provides for sending a communication from a source thread to a destination thread, where the communication requests a reply from the destination thread to the source thread. While the source thread is waiting for the reply to the communication, this method provides for processing events by the concurrency management component on behalf of the source thread so that concurrency problems do not arise while the source thread is waiting. Further, this method provides for receiving the reply to the communication from the destination thread.

In accordance with a second aspect of the present invention, a method is executed in a computer system having a process with a plurality of threads of execution and a plurality of apartments. In accordance with this method of the first aspect of the present invention the threads are for executing within the apartments and the apartments contain objects. This method provides for receiving a communication by a first thread to perform processing within an apartment, determining if a second thread is executing within the apartment, when it is determined that the second thread is not executing within the apartment, executing within the apartment by the first thread to process the communication, and when it is determined that the second thread is executing within the apartment, sending the communication to the second thread for processing.

In accordance with a third aspect of the present invention, a data processing system having a process is provided. The process of the data processing system of the third aspect of the present invention comprises a plurality of objects, a shared data component, and a communication mechanism. The plurality of objects comprises a source object for generating a first communication and for outputting instructions and a destination object for receiving the first communication from the source object. The shared data component is for maintaining data accessible by the objects, wherein the first communication refers to data within the shared data component. The communication mechanism is for sending the first communication from the source object to the destination object and for receiving the instructions from the source object. The communication mechanism further comprises a concurrency management component for executing the instructions received from the source object when a second communication is received by the source object while the communication mechanism is sending the first communication to the destination object but the sending of the first communication has not yet completed, wherein the instructions are for managing concurrency on behalf of the source object so that concurrency problems do not arise while the communication mechanism is sending the first communication.

In accordance with a fourth aspect of the present invention, a data processing system having a process is provided. The process of the data processing system of the fourth aspect of the present invention comprises a plurality of apartments, a remote procedure call component, a plurality of threads of execution, and a shared data component. The plurality of apartments contain procedures for performing operations. The remote procedure call component is for sending a message containing a remote procedure call for invoking a procedure of a destination apartment. The plurality of threads of execution are for receiving the message containing the remote procedure call, for executing the procedure of the destination apartment to process the remote procedure call when the apartment is unoccupied, and for sending the message to a thread occupying the apartment when the apartment is occupied. The shared data component is for maintaining data accessible by the threads of execution, wherein a thread of execution accesses the shared data as part of invoking the procedure.

DETAILED DESCRIPTION OF THE INVENTION

Figure 1:
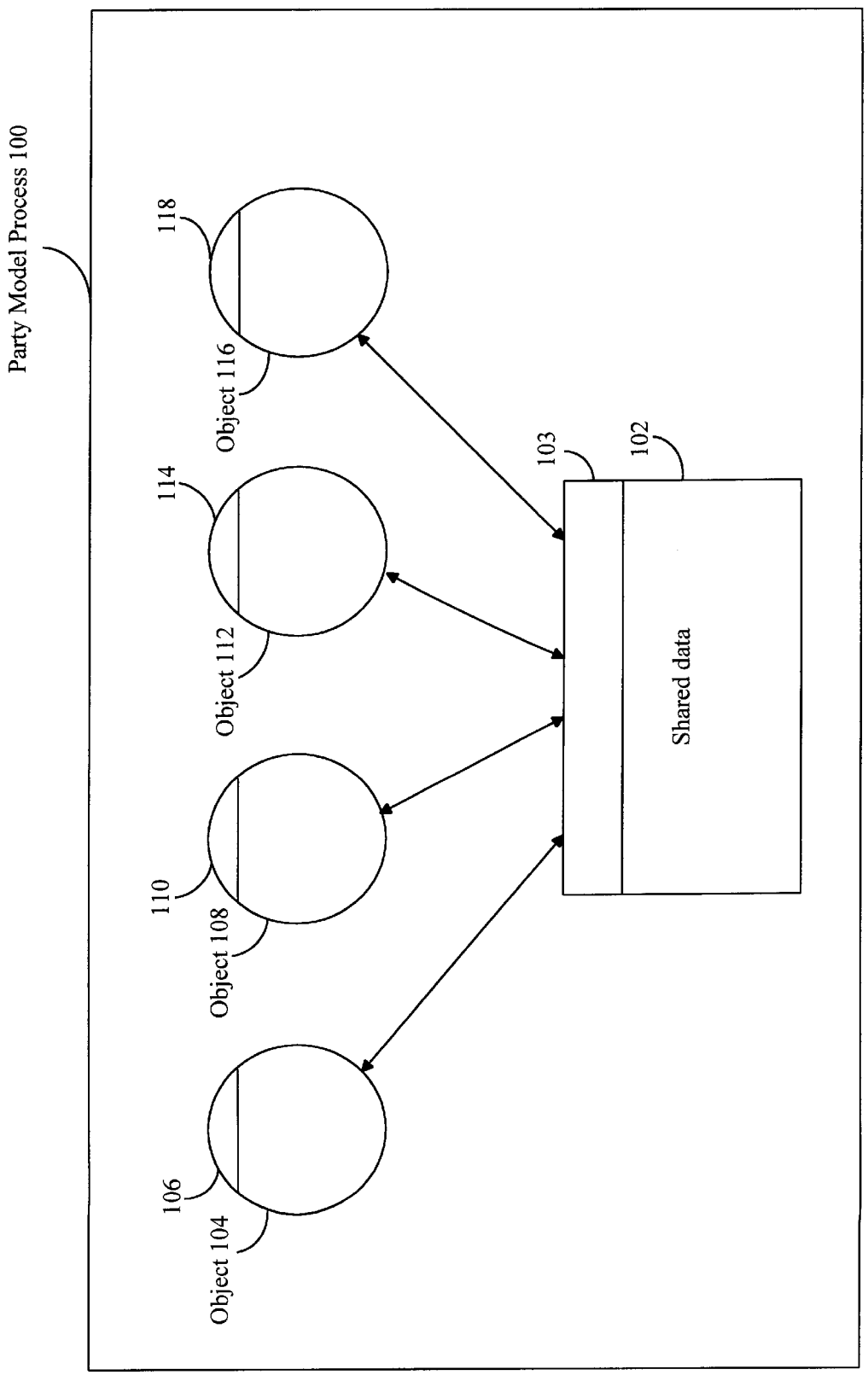
FIG. 1 depicts the components utilized in the conventional free threading mode for multi-threaded processing.
Figure 2:
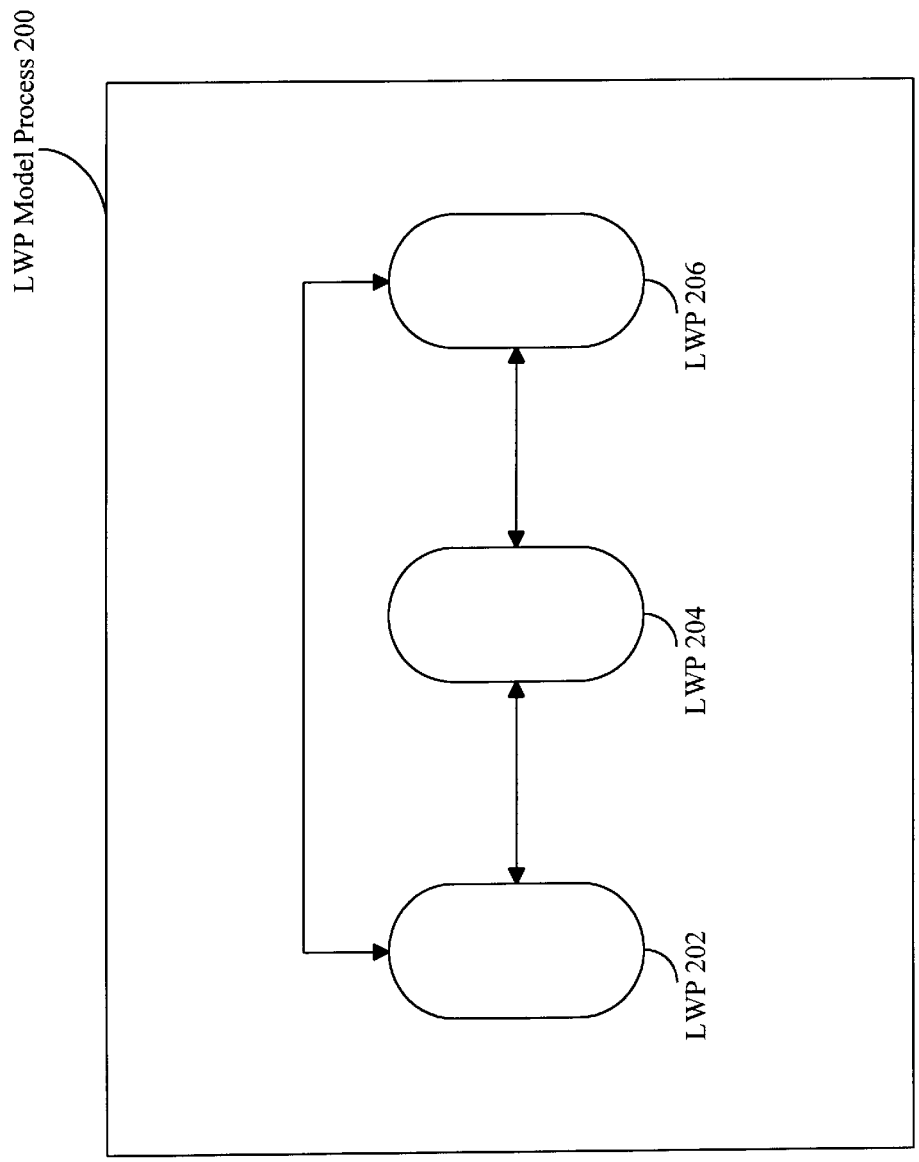
FIG. 2 depicts the components utilized in the conventional lightweight process model for multi-threaded processing.

The preferred embodiment of the present invention provides an improved method and system for performing multi-threaded processing. The preferred embodiment of the present invention is known as the "Apartment Model" for multi-threaded processing. The apartment model is an improvement over conventional systems by having multiple threads, shared data, and concurrency management on a per-thread basis. Each thread has one apartment in which it executes and each apartment contains objects. The shared data is data that is accessible by all threads within the process. The concurrency management of the preferred embodiment is implemented on a per-thread basis and manages the multiple threads so that each thread may concurrently execute in a reliable and robust manner.

The apartment model has a number of significant advantages over conventional systems. First, the apartment model performs concurrency management on a per-thread basis and therefore is an improvement over the free threading model where concurrency management is implemented on an object-by-object basis. This reduces the number of locks that must be implemented, thereby facilitating the implementation of objects and threads. Second, the apartment model is well suited for use with user interface operations. This improvement over conventional systems is realized from having one window on the user interface managed by no more than one thread. Third, the apartment model utilizes shared data which reduces the CPU processing time for transferring data between threads and reduces the CPU processing time for accessing data that needs to be accessible by all threads. CPU processing time is reduced when transferring data since a reference to the data can be transferred instead of a copy of the data. Also, since data that needs to be accessible by all threads is stored in the shared data, a direct memory reference can occur when accessing the data. This is an improvement over the LWP model where a communication to a thread maintaining the data would have to occur.

In an alternative embodiment of the present invention, known as the "rental model," the threads within the process are separate from the apartments within the process and, thus, there is no one-to-one correspondence between apartments and threads. That is, practically any thread can execute in any apartment, but only one at a time. In the rental model, the apartments are merely data structures containing objects and the threads execute within the apartments to perform processing. After performing processing within an apartment, a thread releases the apartment so that the apartment can be used by another thread. Typically in the rental model, the number of threads is less than the number of apartments and each thread is utilized on an as-needed basis. Thus, the number of threads for a process is reduced and the overhead (e.g., register, stack, etc.) associated with each thread is also reduced. In addition, by separating the threads from the apartments, the rental model reduces the amount of processing associated with concurrency management. This is done by a thread determining whether an apartment is in use by another thread ("occupied") or not in use ("unoccupied") before attempting to execute within the apartment. If the apartment is unoccupied, the thread can avoid the processing associated with concurrency management and execute within the apartment without fear of encountering any concurrency problems. It is only when the apartment is occupied that the thread performs processing associated with concurrency management to prevent concurrency problems.

Figure 3:
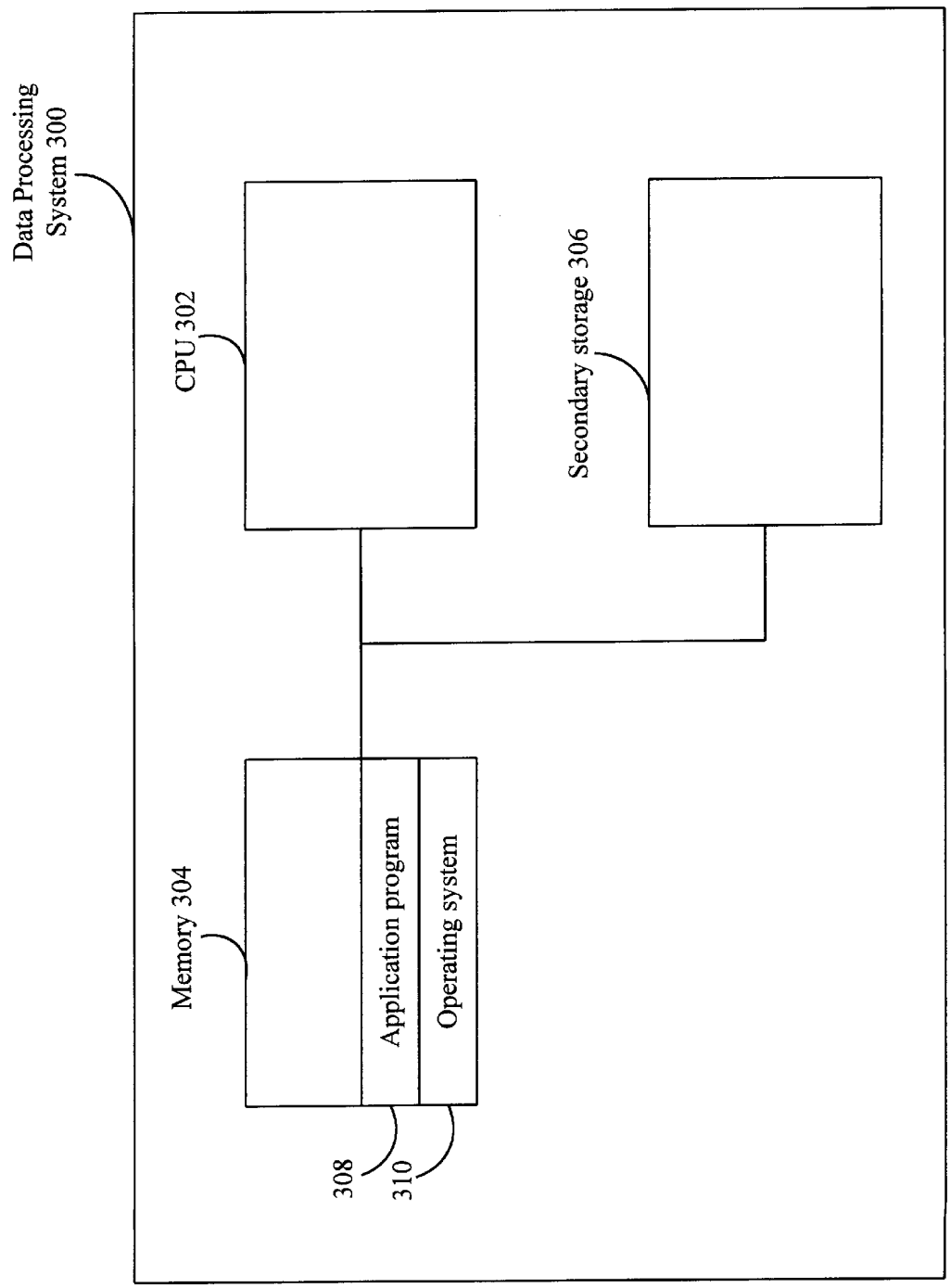
FIG. 3 depicts a data processing system suitable for practicing the preferred embodiment of the present invention.

FIG. 3 depicts a data processing system 300 suitable for practicing the preferred embodiment of the present invention. The data processing system 300 has a CPU 302, a memory 304 and a secondary storage device 306 such as a hard disk drive. The memory 304 holds a copy of an operating system 310, such as the "MICROSOFT WINDOWS NT" operating system sold by Microsoft Corporation of Redmond, Wash., and a copy of an application program 308.

Figure 4:
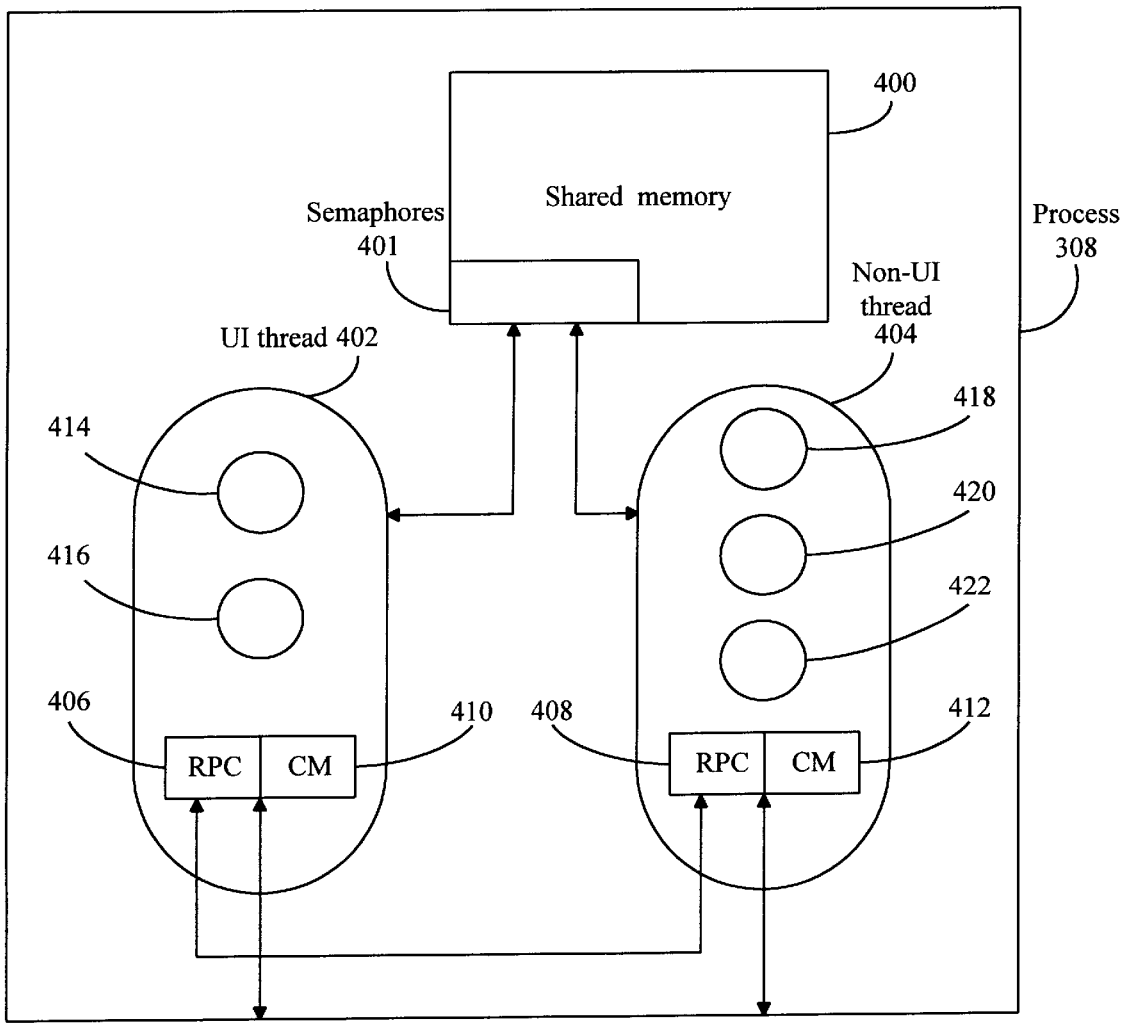
FIG. 4 depicts the components of the apartment model of the preferred embodiment of the present invention.

FIG. 4 depicts the components of a process 308 utilizing the apartment model of the present invention. The process 308 contains shared memory 400, a user interface (UI) thread 402 and a non-UI thread 404. The shared memory 400 is accessible by all threads within the process 308 and access to the shared memory is protected by semaphores 401. The UI thread 402 performs UI operations and contains objects 414, 416, a remote procedure call (RPC) mechanism 406 and a concurrency management (CM) mechanism 410. The RPC mechanism 406 is responsible for sending and receiving messages. The RPC mechanism 406 can both send messages to other threads within the process 308 as well as messages to other processes. The messages sent by the RPC mechanism 406 can be used to invoke the methods on objects in other threads or other processes. The CM mechanism 410 is responsible for handling concurrency problems so that the threads within the process 308 can execute concurrently in a reliable and robust manner. A suitable CM mechanism for use in the apartment model is more fully described in U.S. patent application Ser. No. 08/224,859, entitled "Concurrency Management in a Communication Mechanism," now U.S. Pat. No. 5,675,796, entitled "Concurrency Management Component for Use by a Computer Program During the Transfer of a Message," which is hereby incorporated by reference. The non-UI thread 404 performs operations not associated with a user interface and contains objects 418, 420, 422, the RPC mechanism 408, and the CM mechanism 412. Although only two threads are depicted, one skilled in the art will appreciate that additional or fewer threads can be used by the present invention.

A developer of an application program can conform to the apartment model for multi-threaded processing and thus take advantage of the benefits of the apartment model by utilizing apartments, shared memory, an RPC mechanism, and a CM mechanism. The developer utilizes apartments for their application program by dividing the application program into discrete units of functionality. Each discrete unit of functionality is then implemented as an apartment containing objects where each object performs functionality related to the discrete unit of functionality of the apartment. The developer utilizes shared memory by allocating a portion of memory within the address space of the application program to be accessible by all apartments. The developer then defines which data within the application program should be placed into shared memory and develops semaphores to serialize access to the shared data. However, the semaphores may be provided to the developer as an operating system facility. The developer utilizes an RPC mechanism by either developing an RPC mechanism or by incorporating any of a number of well-known RPC mechanisms into the application program. The developer utilizes a CM mechanism in the application program by utilizing any acceptable CM mechanism such as the CM mechanism described in U.S. patent application Ser. No. 08/224,859, entitled "Concurrency Management in a Communication Mechanism," now U.S. Pat. No. 5,675,796, entitled "Concurrency Management Component for Use by a Computer Program During the Transfer of a Message." After utilizing the apartments, the shared memory, the RPC mechanism and the CM mechanism in the application program, the application program can then take advantage of the apartment model for multi-threaded processing.

The shared memory of the apartment model contains a data structure that is accessible by all threads within the process. This data structure contains an entry for each object in the process. Each entry in the data structure contains a field for the object ID, the apartment ID in which the object is located, a handle ("window handle") to one or more windows associated with the thread, and a pointer to the object. In accessing the data structure, since the data structure is protected by semaphores, a thread must go through a specific procedure. This procedure is as follows: the thread wishing to access the data structure first executes a "wait" command, which identifies that the thread will wait until the data structure is available; when the data structure is available, the thread accesses the data structure to retrieve or store whichever entries are needed; and when the thread has completed accessing the data structure, the thread performs a "signal" command, which indicates that the data structure is available for use by another thread.

As previously stated, the CM mechanism performs concurrency management for the threads in a process. In order to use the CM mechanism, a thread must first register with the CM mechanism by invoking the CoRegisterMessageFilter routine, which is described in more detail in U.S. patent application Ser. No. 08/224,859, entitled "Concurrency Management in a Communication Mechanism," now U.S. Pat. No. 5,675,796, entitled "Concurrency Management Component for Use by a Computer Program During the Transfer of a Message." After registering with the CM mechanism, the CM mechanism can be utilized to perform concurrency management processing. A thread, in utilizing the CM mechanism, will typically send a message to an object in another thread or another process. While the thread is waiting for a successful reply to the message sent, the CM mechanism enters a loop and handles all events that occur. Such events include incoming messages, unsuccessful replies and window messages. Incoming messages are handled by the CM mechanism by determining if the thread is in a state where it can handle the message. If the thread is in such a state, the thread processes the message. Otherwise, the incoming message is rejected. The term "window messages" refers to messages destined for the window associated with the thread. The processing of the CM mechanism is more fully described in U.S. patent application Ser. No. 08/224,859, entitled "Concurrency Management in a Communication Mechanism," now U.S. Pat. No. 5,675,796, entitled "Concurrency Management Component for Use by a Computer Program During the Transfer of a Message," which has previously been incorporated by reference.

The "WINDOWS NT" operating system can be used to transfer messages between processes and threads within a data processing system. This transfer of messages is performed by the operating system maintaining a message queue for each thread that has a window. When the operating system receives a message, it puts the message onto the message queue of the thread for which the message is destined and the thread can then retrieve the message from the message queue. In retrieving messages from the message queue, a thread typically uses a "message loop." In the message loop, the thread continually retrieves messages and processes the messages for the lifetime of the thread. This message loop performs functionality dependent upon whether the thread performs user interface operations (i.e., has a window) or does not perform user interface operations. This will be described in more detail below. In order to interact with the message queue, "WINDOWS NT" provides various routines: GetMessage, PostMessage, and DispatchMessage. The GetMessage routine retrieves the next message from the message queue maintained by the operating system for a particular thread. The PostMessage routine is used by a thread to pass a message to the operating system and the operating system will then place the message onto the message queue for the thread for which the message is destined. The DispatchMessage routine is invoked by a thread to pass a message to the operating system and, in turn, the operating system will invoke the appropriate window procedure for handling the message. Another mechanism used by "WINDOWS NT" to transfer messages is the window procedure ("WinProc"). Every window has an associated WinProc and a thread can have more than one window. This WinProc is defined by the thread and invoked by the operating system when the operating system receives an event for the thread. Such an event may include timer expiration, the button of a mouse being depressed, or movement of the mouse. WinProcs will be discussed in more detail below. Although the apartment model of the preferred embodiment of the present invention is described as using the "WINDOWS NT" operating system, one skilled in the art will appreciate that other operating systems can be used.

Figure 5:
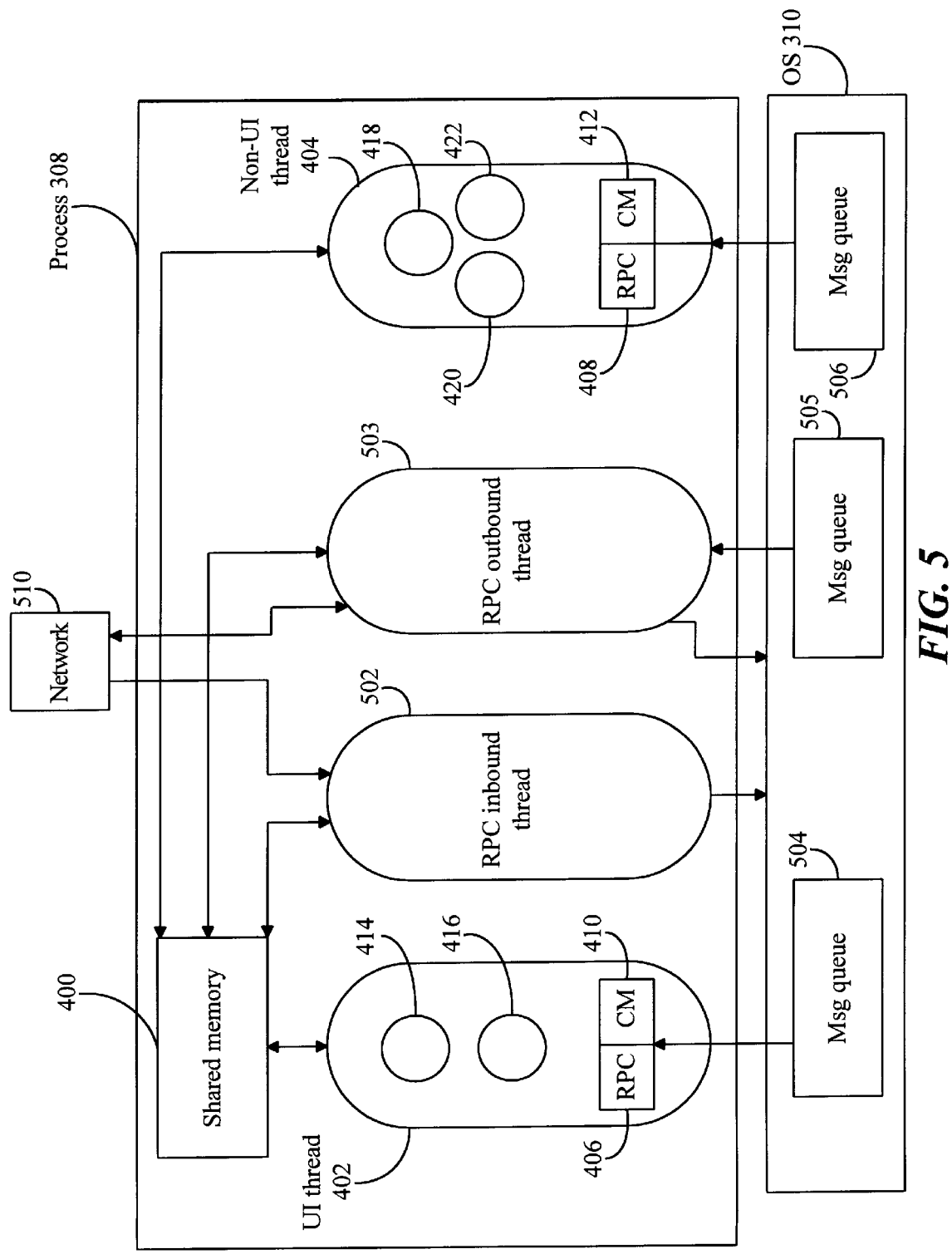
FIG. 5 depicts a more detailed diagram of the components of the apartment model of the preferred embodiment of the present invention.

FIG. 5 depicts a more detailed diagram of a process 308 utilizing the apartment model and interacting with the operating system (OS) 310 and a network 510. The process 308 has shared memory 400, a UI thread 402, a non-UI thread 404, an RPC inbound thread 502 and an RPC outbound thread 503. The RPC inbound thread 502 is responsible for receiving messages from the network 510 or an RPC outbound thread from another process, and passing the messages to the OS 310 for delivery to the threads 402, 404. The RPC outbound thread 503 receives messages from the threads 402, 404 indirectly through a message queue 505 and sends the messages to the network 510 or to the OS 310 where the messages are delivered to an RPC inbound thread in another process. The network 510 used by the present invention can be any of a number of networks including, but not limited to, a local area network or a wide area network. The operating system 310 contains a message queue 504 that contains messages for the UI thread 402, a message queue 505 that contains messages for the RPC outbound thread 503 and a message queue 506 that contains messages for the non-UI thread 404. The non-UI thread 404 and the RPC outbound thread 503 of the present invention display an invisible window so that the OS 310 will maintain a message queue 506 for the non-UI thread and the RPC outbound thread.

Figure 6:
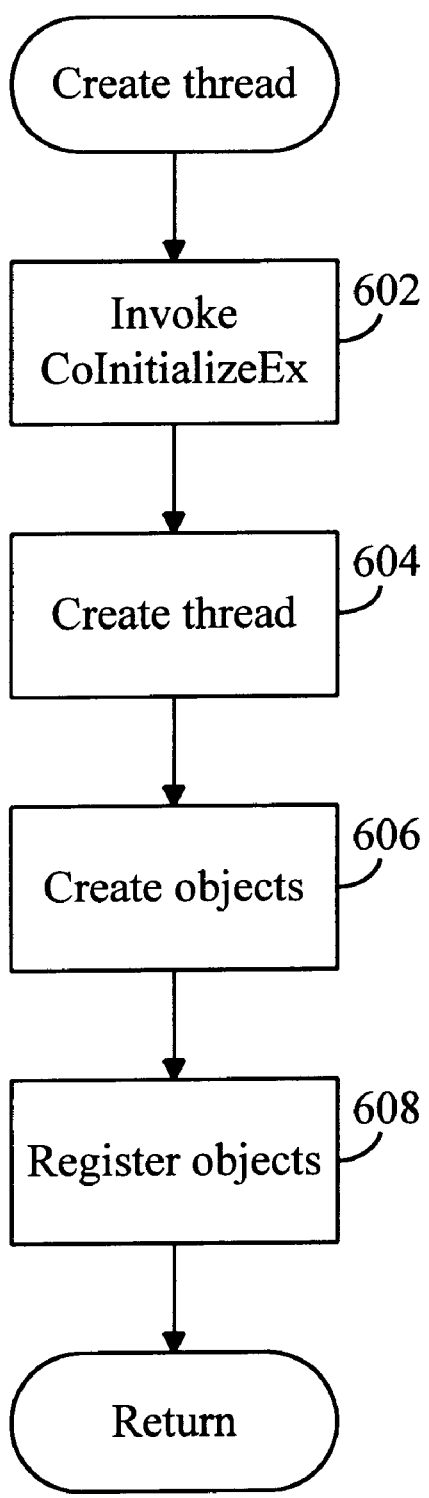
FIG. 6 depicts a flow chart of the steps performed in creating a thread in the apartment model of the preferred embodiment of the present invention.

FIG. 6 depicts a flowchart of the steps performed in creating a thread. The steps described herein can be performed statically or dynamically. That is, the creation of a thread within the apartment model can be performed as part of initialization, before normal processing begins, or as part of normal processing. The steps described are typically performed by the main thread of a process or, alternatively, the steps can be performed by another thread. The first step performed in creating a thread is to invoke the CoInitializeEx routine (step 602). The CoInitializeEx routine is a call to the RPC inbound thread that makes an entry in the data structure in the shared memory for the new thread and creates a window handle for the new thread. After invoking the CoInitializeEx routine, the thread invokes the CreateThread routine (step 604). The CreateThread routine is a call to the operating system that creates a new thread for a process. The arguments to the CreateThread routine include the starting address of the code that the thread is to execute. After creating the thread, the thread then creates objects within the newly created thread (step 606). The creation of the objects and the functions performed by the objects depend on the functionality of the process in which the objects and thread are created and are therefore said to be "application specific." For example, if the process were a spreadsheet program, one object may be implemented for each cell in a spreadsheet with the methods of the object being used to manipulate the data within the cell. After creating the objects, the thread registers the created objects with the data structure in the shared memory (step 608). In this step, the main thread adds entries to the data structure for each object that is created in the newly created thread. After registering the objects, all of the processing necessary for creating a thread in the apartment model is completed.

Figure 7:
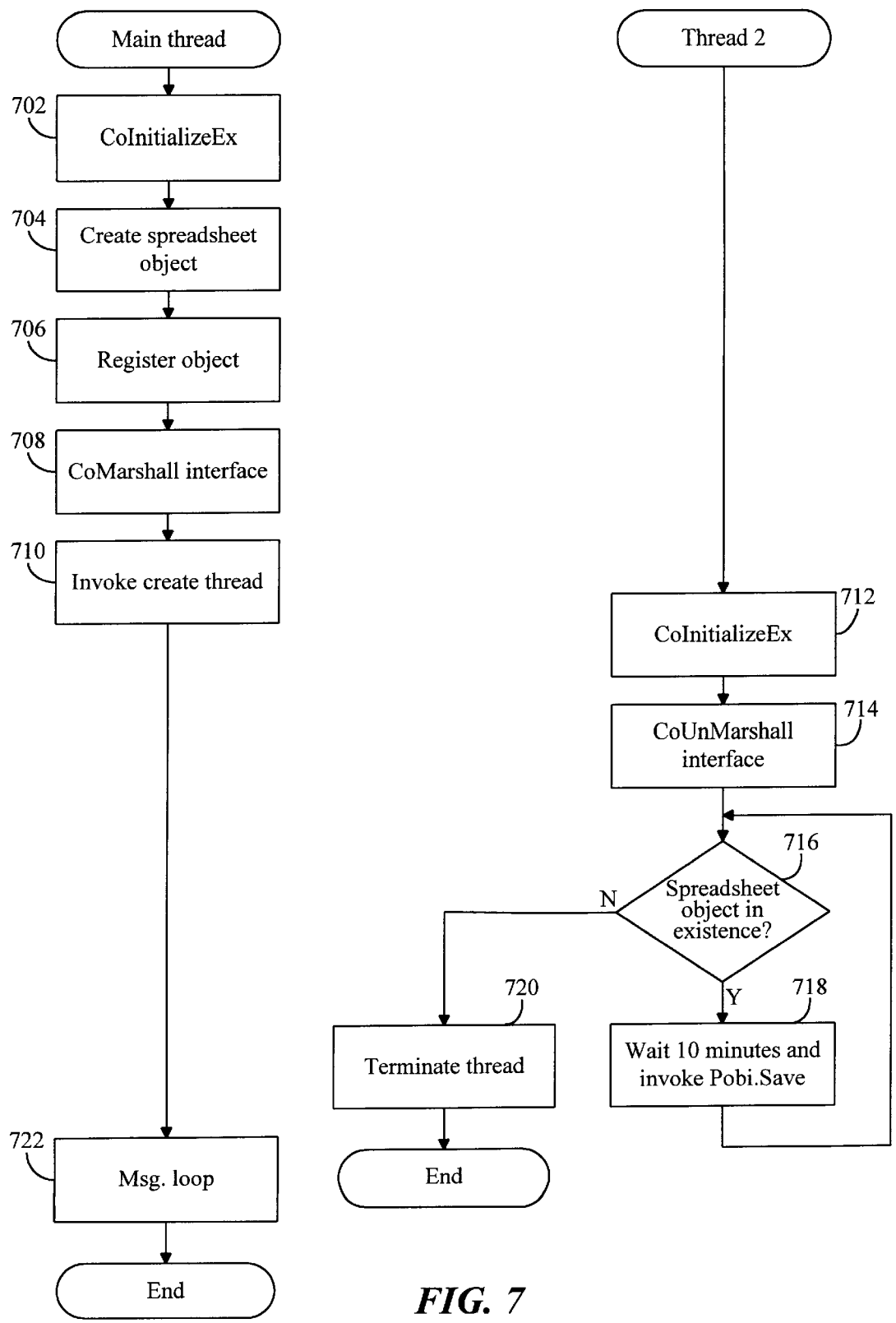
FIG. 7 depicts an example of a process utilizing the apartment model of the preferred embodiment of the present invention.

To more clearly describe the creation and use of threads within an application program, consider FIG. 7 which depicts an example of the creation and utilization of a thread in the apartment model. This example describes a thread created as part of the processing of a spreadsheet program. In this example, the main thread of the spreadsheet program is responsible for creating a spreadsheet object and the main thread subsequently creates a second thread, "thread 2," that performs "auto save" functionality. Auto save functionality refers to automatically saving the spreadsheet every ten minutes while the spreadsheet is open for user manipulation. The example described below is designed to operate in an object oriented environment, such as an environment that supports the Microsoft OLE 2.0 protocol established by Microsoft Corporation of Redmond, Wash. One skilled in the art will recognize that the present invention can be practiced in a non-object oriented environment as well as other object oriented environments.

The first step performed in the spreadsheet example is that the main thread invokes the CoInitializeEx routine (step 702). The processing of this step is similar to that as described relative to step 602 of FIG. 6. After invoking the CoInitializeEx routine, the main thread creates a spreadsheet object. In this step, the main thread creates an object representative of a spreadsheet with methods to manipulate the spreadsheet. After creating the spreadsheet object, the main thread registers the object with the data structure in the shared memory (step 706). The processing of this step is similar to that as described relative to step 608 of FIG. 6. After registering the object, the main thread invokes the CoMarshalInterface routine to prepare an interface to the spreadsheet object to be marshaled to thread 2 (step 708). The term "interface" refers to a collection of methods on an object and the term "marshalling" refers to transferring a pointer of an interface to an entity, so that the entity can invoke the methods on the interface. The CoMarshalInterface routine is more clearly described in U.S. patent application Ser. No. 08/158,627, entitled "Method and System for Network Marshalling of Interface Pointers for Remote Procedure Calls," now U.S. Pat. No. 5,511,197, which is hereby incorporated by reference. After invoking the CoMarshalInterface routine, the main thread invokes the create thread routine to create thread 2 (step 710).

After invoking the create thread routine, thread 2 is created and the code for thread 2 is executed on the path of execution for thread 2. The first step performed by thread 2 is to invoke the CoInitializeEx function (step 712). After invoking the CoInitializeEx function, thread 2 invokes the CoUnmarshalInterface routine (step 714). The CoUnmarshalInterface routine returns a pointer to an interface on the spreadsheet object so that thread 2 can invoke the methods on the spreadsheet object. After invoking the CoUnmarshalInterface routine, thread 2 determines if the spreadsheet object is still in existence (step 716). While the spreadsheet object is in existence, thread 2 waits 10 minutes and invokes Pobj.Save (step 718). In this step, "Pobj" refers to a pointer to the interface and the "Save" method refers to a method that saves the spreadsheet object. Thus, this step automatically saves the spreadsheet object every 10 minutes while the object is in existence. If, however, the spreadsheet object were ever deleted, thread 2 terminates the thread (step 720). In this step, thread 2 is terminated and all of the overhead (e.g., CPU registers, stack, etc.) is released. After terminating the thread, the processing for thread 2 ends.

With reference to the main thread, after the main thread has invoked the create thread routine and the create thread routine has returned, the main thread goes into a message loop for the lifetime of the main thread (step 722). During the processing of the message loop, the main thread can receive events from a number of sources including the keyboard, the operating system or thread 2. All messages and events are interleaved and received one at a time via the message loop.

Although the spreadsheet example has been described using the CoMarshalInterface and CoUnmarshalInterface routines, one skilled in the art will appreciate that other routines can be used to pass interface pointers or references to objects. One example of such an alternative is utilizing the BindToObject routine. The BindToObject routine is more clearly described in U.S. patent application Ser. No. 08/088,724, entitled "Method and System for Naming and Binding Objects," now abandoned which is hereby incorporated by reference. In addition, one skilled in the art will appreciate that other OLE routines can be used as well as other functions of other object models. Although the creation of objects has been described relative to a newly created thread, one skilled in the art will recognize that in the present invention a thread (or apartment) can be created without objects or that objects can be created and deleted dynamically during the lifetime of the thread.

Figure 8:
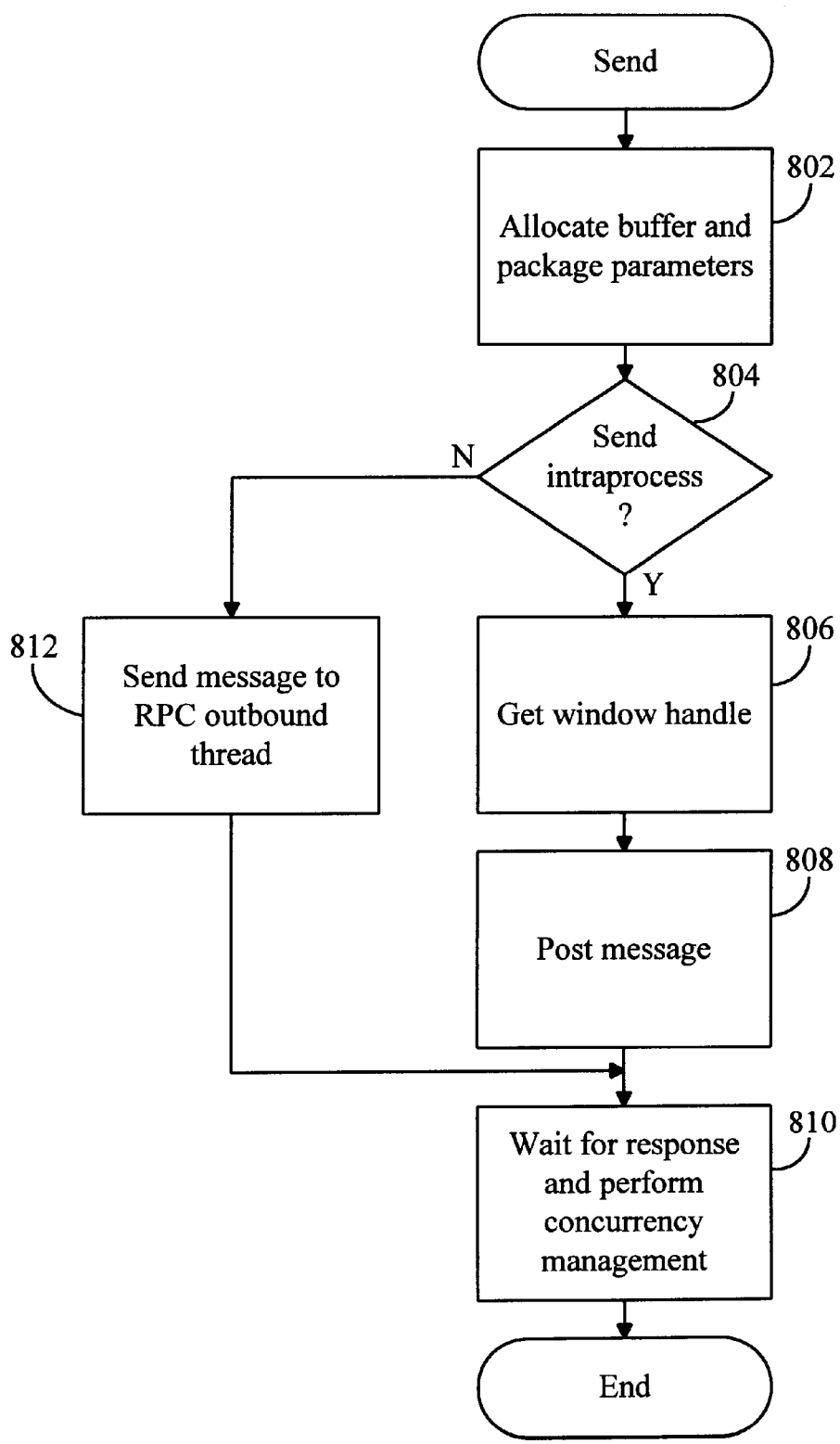
FIG. 8 depicts a flow chart of the steps performed by an RPC mechanism of a thread of the apartment model of the preferred embodiment of the present invention when sending a message.

FIG. 8 depicts the steps performed by the RPC mechanism of a thread in the apartment model when sending a message. The processing described is applicable to both UI threads and non-UI threads. In describing the processing, it is assumed that the thread has previously invoked the CoRegisterMessageFilter routine, which registers the thread with the CM mechanism. After registering with the CM mechanism, the thread can utilize the CM mechanism to perform concurrency management. The first step performed by the RPC mechanism is to allocate a buffer and package the parameters for the message into the buffer (step 802). The parameters of the message include the object ID of the object for which the message is destined, the method ID of the method for invocation, parameters for the method and the communication port ID. One skilled in the art will appreciate that additional or different parameters may be used by the present invention. The communication port ID is discussed in more detail below. After packaging the parameters, the RPC mechanism determines whether the destination for the message is intraprocess (step 804). In this step, the RPC mechanism examines the communication port ID within the message. Each message has a communication port ID that is an identifier of the destination of the message and can therefore identify that the message is destined for an intraprocess thread. In addition, the communication port ID can refer to the communication port of the network or the communication port of an RPC inbound thread that is in another process. A "communication port" is a portion of the destination that is used for receiving and storing messages. Alternatively, a communication port can refer to a mechanism for transferring data to the destination's memory. If the destination is an object of a thread within the process, the RPC mechanism retrieves the window handle from the data structure for the destination thread (step 806). After retrieving the window handle for the destination thread, the RPC mechanism invokes the PostMessage routine (step 808). In this step, the RPC mechanism passes the message to the operating system and the operating system places the message onto the appropriate message queue for the destination thread. If the message is destined for outside of the process, the RPC mechanism sends the message to the RPC outbound thread (step 812). The RPC mechanism sends the message to the RPC outbound thread via the operating system where it is placed on the message queue of the RPC outbound thread. After receiving the message, the RPC outbound thread will then send the message to another process either locally or over the network. After either sending the message to the RPC outbound thread or posting the message, the RPC mechanism waits for a response to the outstanding message and performs concurrency management while waiting for the response (step 810). One benefit to using an RPC outbound thread in step 812 is that step 810 can be performed for all messages (both intra-process and RRC messages) and therefore centralizes concurrency management processing. That is, there is one step that is invoked for receiving responses to all types of messages. The CM mechanism performs concurrency management by processing all incoming messages, window messages, and unsuccessful responses to the message until a successful response to the message is received. After receiving a successful response to the message, processing ends. Although the RPC mechanism has been described as centralizing concurrency management processing, one skilled in the art will appreciate that instead of utilizing an RPC outbound thread in step 812, the present invention can send an RPC message directly over a network or other transport and then in step 810 wait for responses over multiple receive channels.

Figure 9:
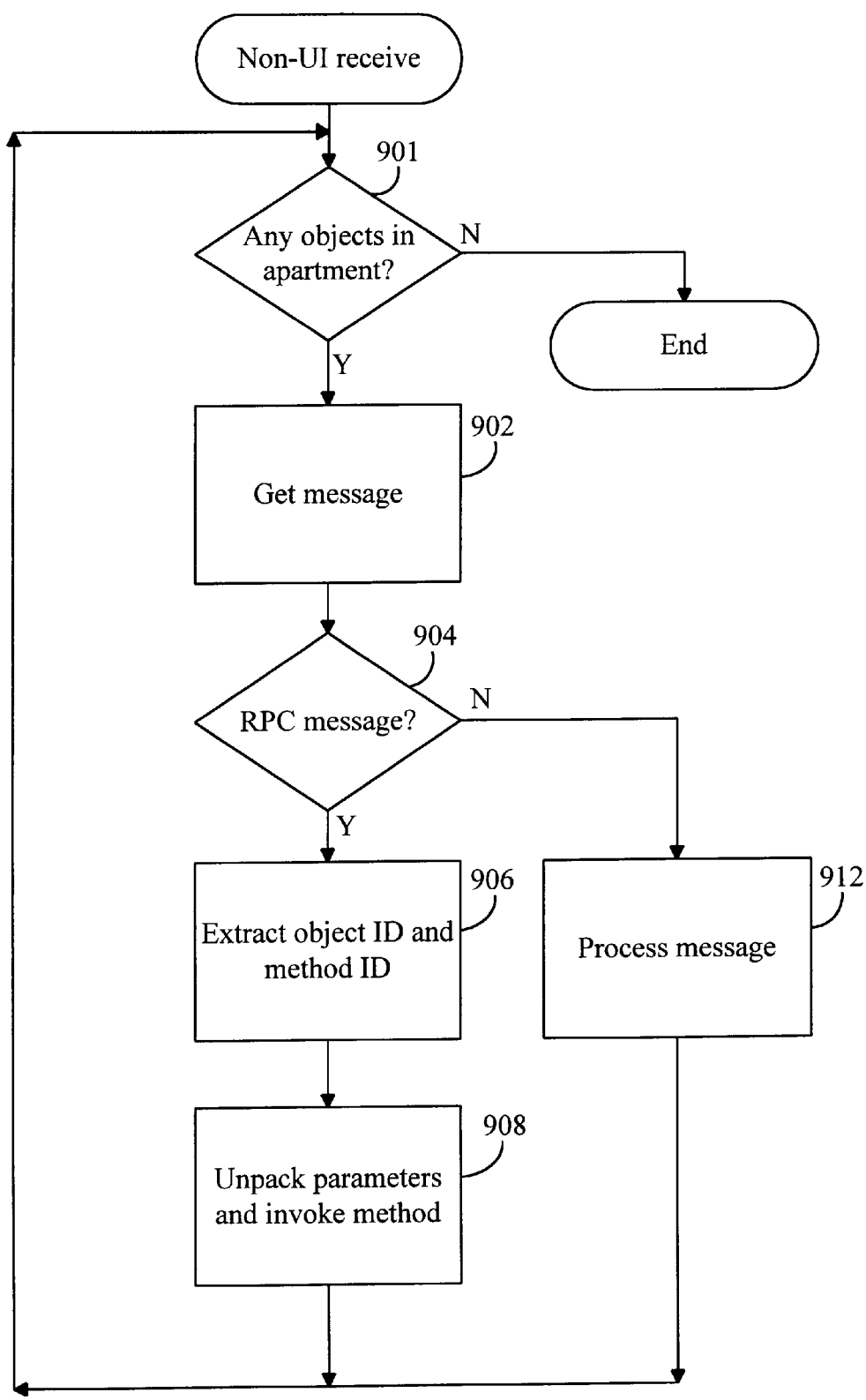
FIG. 9 depicts a flow chart of the steps performed by the message loop of a thread of the apartment model of the preferred embodiment of the present invention that does not perform user interface operations.

FIG. 9 depicts a flowchart of the steps performed by the message loop for a non-UI thread. The first step performed by the message loop is to determine whether the thread has any objects in the apartment (step 901). If during the lifetime of the thread all of the objects in the apartment were deleted, processing ends. Otherwise, the non-UI thread invokes the GetMessage routine (step 902). In this step, the GetMessage routine retrieves the next message from the message queue for the non-UI thread. After retrieving the message, the non-UI thread determines whether the message retrieved is an RPC message (step 904). This is done by examining the parameters of the message. If the message retrieved is an RPC message, the non-UI thread extracts the object ID and the method ID from the message (step 906). After extracting the object ID and the method ID, the non-UI thread unpacks the parameters from the message and invokes the particular method on the object (step 908). In this step, the parameters for the particular method are unpacked and the method is invoked with the parameters. If, however, the non-UI thread receives a message other than an RPC message, the non-UI thread processes the message (step 912). In this step, the non-UI thread may have received another type of message either from the operating system or from another thread or process and the non-UI thread will process the message accordingly. This processing is application specific. After either processing a non-RPC message or invoking the method on the object, processing continues to step 901. Although only one mechanism, step 901, has been described for terminating the message loop, one skilled in the art will appreciate that other mechanisms can be used.

Figure 10:
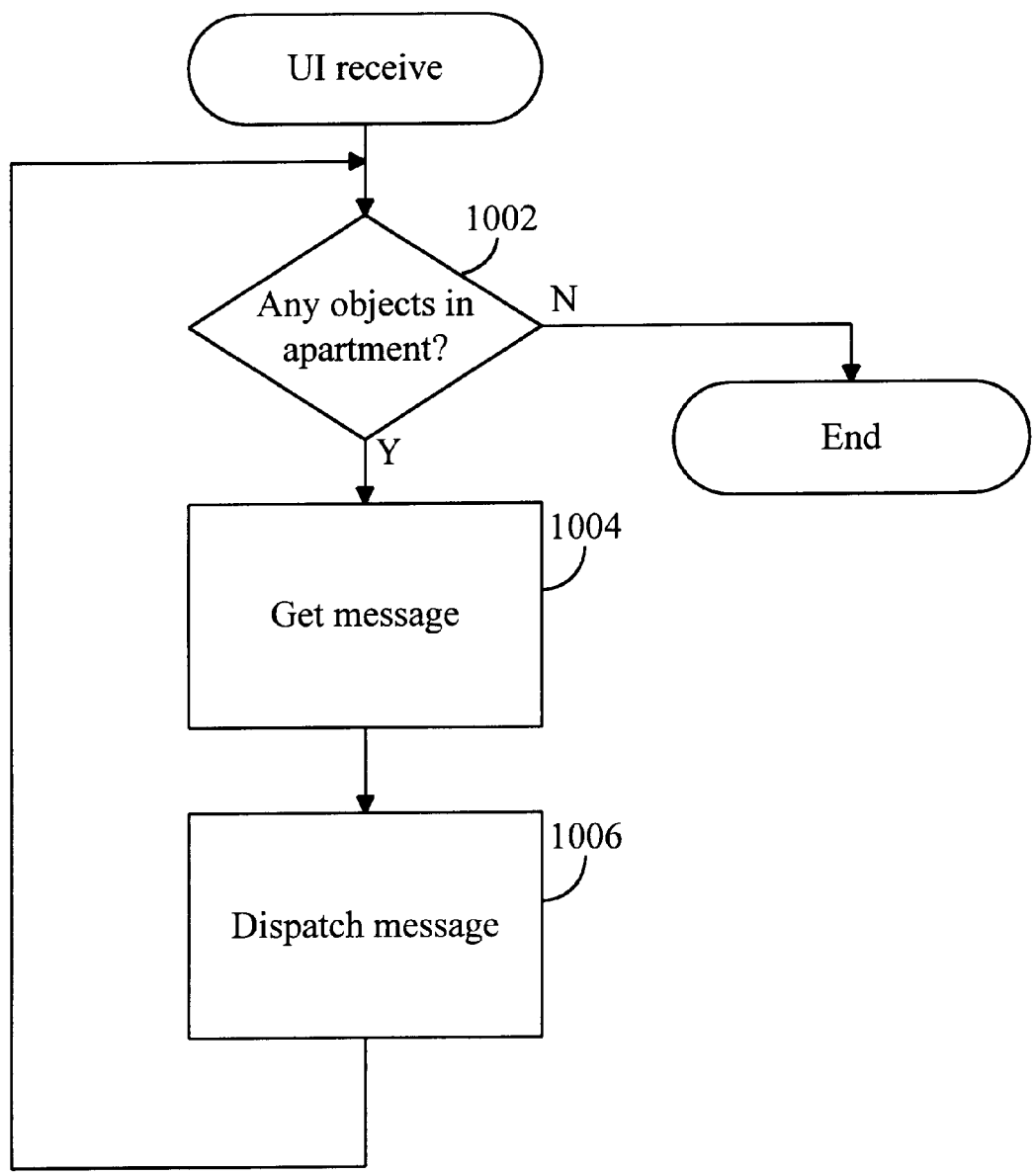
FIG. 10 depicts a flow chart of the steps performed by the message loop of a thread of the apartment model of the preferred embodiment of the present invention that performs user interface operations.

FIG. 10 depicts the steps performed by the message loop for a UI thread. The first step performed by the message loop is to determine whether the thread has any objects in the apartment (step 1002). If during the lifetime of the thread all of the objects were deleted from the apartment, processing ends. However, while there are objects in the apartment, the message loop invokes the GetMessage routine (step 1004) and the DispatchMessage routine (step 1006). The GetMessage routine retrieves the next message from the message queue for the thread. The DispatchMessage routine sends the retrieved message to the operating system so that the operating system can invoke the window procedure for this thread to handle the message. Although only one mechanism, step 1002, has been described for terminating the message loop, one skilled in the art will appreciate that other mechanisms can be used.

Figure 11A:
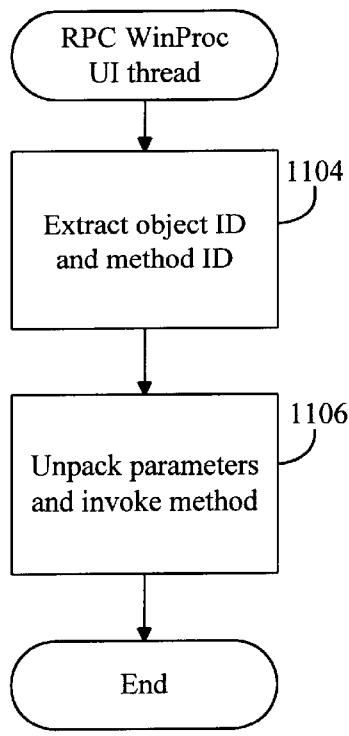
FIG. 11A depicts a flow chart of the steps performed by an RPC window procedure of a thread of the apartment model of the preferred embodiment of the present invention that performs user interface operations.

A UI thread has two window procedures: an RPC window procedure for handling RPC messages and a UI window procedure for handling events from the operating system. FIG. 11A depicts the steps performed by the RPC window procedure for a UI thread. The RPC WinProc for a UI thread receives messages from other threads. The first step performed by the RPC WinProc of a UI thread is to extract the object ID and the method ID from the message (step 1104). After extracting the object ID and the method ID, the RPC WinProc unpacks the parameters for the method from the message and invokes the appropriate method (step 1106). As part of invoking the method, when the method invocation completes, the appropriate parameters are returned. The processing of this step is similar to that described relative to step 908 of FIG. 9. After invoking the appropriate method, the processing ends.

Figure 11B:
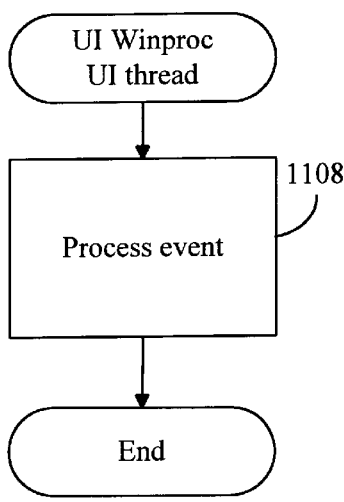
FIG. 11B depicts a flow chart of the steps performed by a UI window procedure of a thread of the apartment model of the preferred embodiment of the present invention that performs user interface operations.

FIG. 11B depicts the steps performed by the UI window procedure for a UI thread. The UI WinProc receives events from the operating system. The term "events" is generally used to refer to everything received via the operating system, including messages. The first step performed by the UI WinProc is to process the event (step 1108). In this step, the UI WinProc has received an event such as a MOUSE_DOWN event. In response to receiving the event, the WinProc will perform application specific processing. After processing the event, processing ends.

Although the processing of FIGS. 10, 11A and 11B has been described relative to a UI thread, one skilled in the art will appreciate that the non-UI threads of the present invention can also perform this processing. That is, since the non-UI threads of the present invention utilize an invisible window, the non-UI threads can be implemented using the WinProcs described in FIGS. 11A and 11B.

Figure 12:
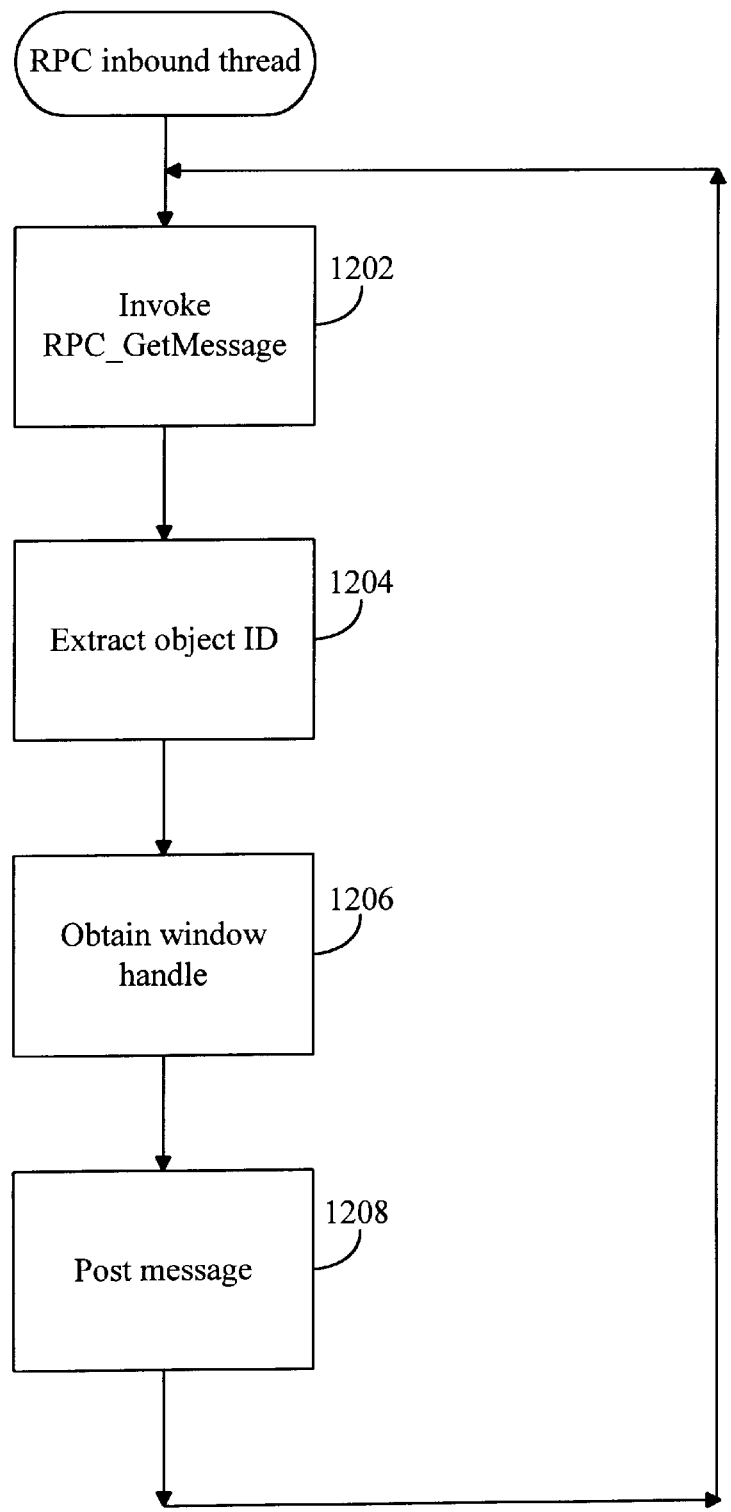
FIG. 12 depicts a flow chart of the steps performed by the RPC inbound thread of the apartment model of the preferred embodiment of the present invention.

FIG. 12 depicts a flowchart of the steps performed by the RPC inbound thread of the preferred embodiment. The first step performed by the RPC inbound thread is to invoke the RPC_GetMessage routine (step 1202). The RPC_GetMessage routine retrieves a message from its communication port that is destined for a thread within the process. As previously stated, each RPC inbound thread has a communication port that stores messages received from the network or from an RPC outbound thread from another process. After invoking the RPC_GetMessage routine, the RPC inbound thread extracts the object ID from the message (step 1204). After extracting the object ID, the RPC inbound thread obtains the window handle to the thread for which the message is destined (step 1206). In this step, the RPC inbound thread accesses the data structure in the shared memory with the object ID so as to obtain the window handle. After obtaining the window handle, the RPC inbound thread invokes the PostMessage routine (step 1208). In this step, the PostMessage routine passes the message to the operating system and the operating system, in turn, places the message onto the appropriate message queue for the thread for which the message is destined. One of the parameters to the PostMessage routine is the window handle of the destination thread. After invoking the PostMessage routine, processing continues to step 1202.

Figure 13:
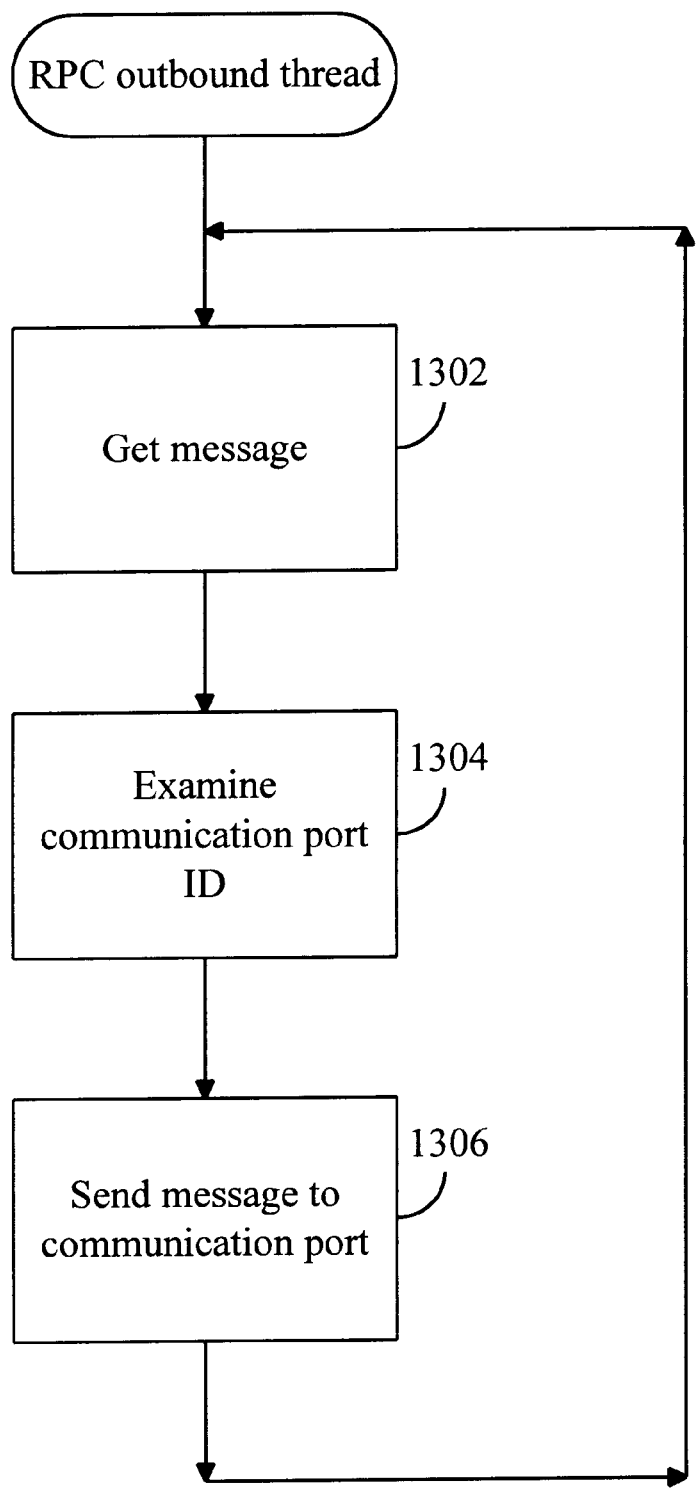
FIG. 13 depicts a flow chart of the steps performed by the RPC outbound thread of the apartment model of the preferred embodiment of the present invention.

FIG. 13 depicts a flowchart of the steps performed by the RPC outbound thread. The first step performed by the RPC outbound thread is to invoke the GetMessage routine (step 1302). In this step, the RPC outbound thread retrieves a message from its message queue. Although the preferred embodiment is described as retrieving a message from the message queue, one skilled in the art will appreciate that the present invention can receive messages via other mechanisms. After invoking the GetMessage routine, the RPC outbound thread examines the communication port ID contained within the message (step 1304). In this step, the RPC outbound thread retrieves the communication port ID, which may be a reference to the communication port of the network or the communication port of an RPC inbound thread of another process. After examining the communication port ID, the RPC outbound thread sends the message to the referenced communication port (step 1306). After sending the message to the referenced communication port, the RPC outbound thread continues to step 1302 and invokes the GetMessage routine. The RPC outbound thread continues processing steps 1302–1306 until the RPC outbound thread is terminated.

Figure 14:
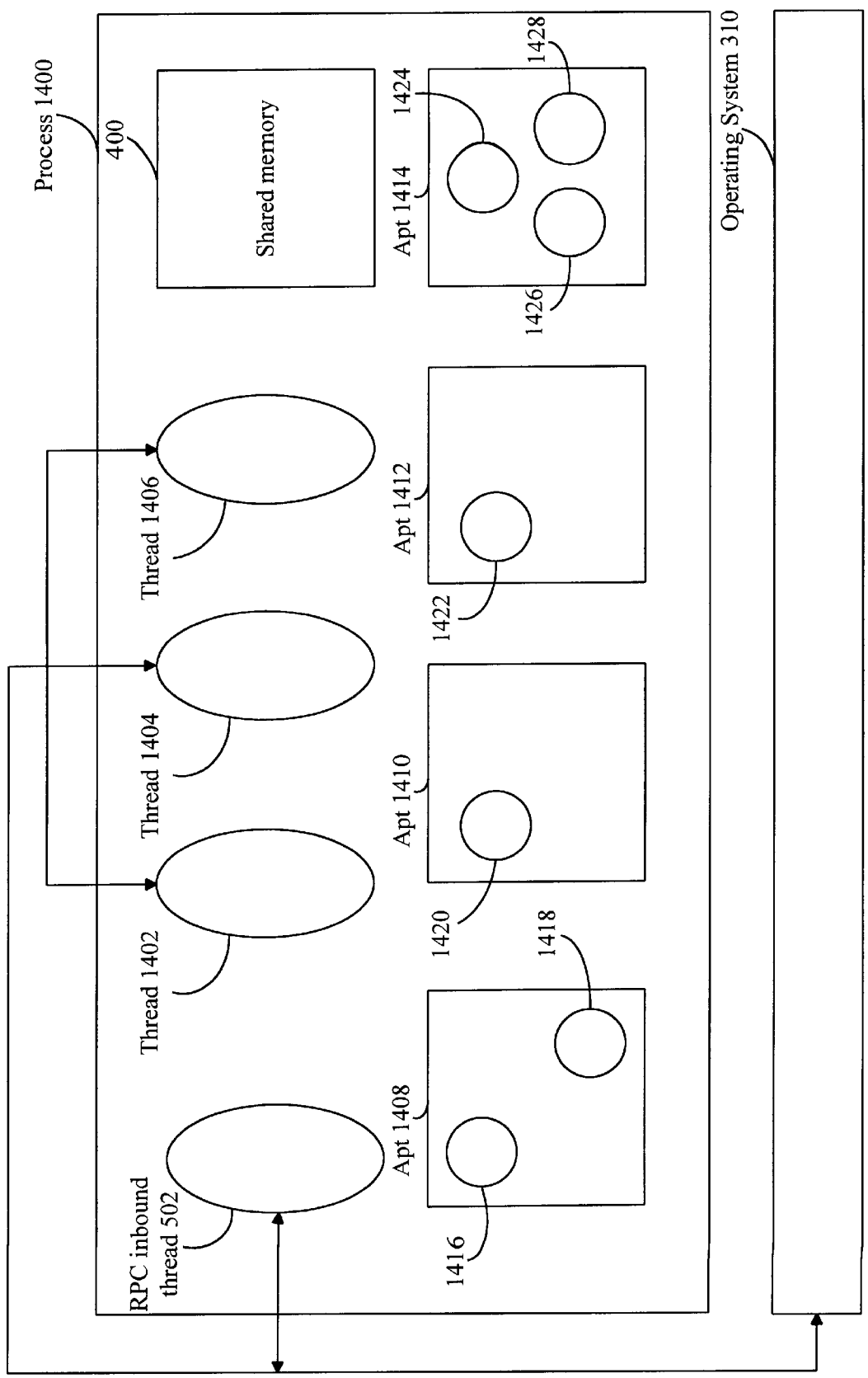
FIG. 14 depicts the components of the rental model of an alternative embodiment of the present invention.

The rental model is an alternative embodiment of the present invention where the threads are separate from the apartments in which the threads execute. Using the rental model, there are typically less threads than apartments. This has the advantage of reducing the overhead associated with having multiple threads. Another advantage to having threads separate from the apartments in which they execute is that concurrency management processing is reduced. That is, when a thread needs to execute within an apartment, if the apartment is unoccupied, there is no need to perform concurrency management when accessing the apartment. This saves the processing time associated with performing concurrency management. As shown in FIG. 14, a process 1400 utilizing to the rental model interacts with the operating system 310. The process 1400 has a number of threads 1402, 1404, 1406, including an RPC inbound thread 502, and a number of apartments 1408, 1410, 1412, and 1414. The apartments 1408, 1410, 1412, 1414 have objects 1416, 1418, 1420, 1422, 1424, 1426, 1428. The threads 1402, 1404, 1406 are independent paths of execution that receive messages from either another thread or the RPC inbound thread 502 via the operating system 310. The RPC inbound thread 502 receives messages (RPC messages) from another process via the operating system 310. Regardless of whether the thread is an RPC inbound thread or not, the processing performed by each thread is similar. Upon receiving a message, a thread will examine the message and determine the apartment in which the thread must execute in order to process the message. The thread then determines whether the apartment is occupied or unoccupied, and if the apartment is unoccupied, the thread occupies the apartment and processes the message. Otherwise, if the apartment is occupied, the thread sends a message to the thread occupying the apartment by posting a message to the operating system. This message will then be retrieved by the thread executing within the apartment and handled by the CM mechanism. That is, the message will be interleaved in the message queue and processed if the thread occupying the apartment is in a state capable of handling the message.

Figure 15:
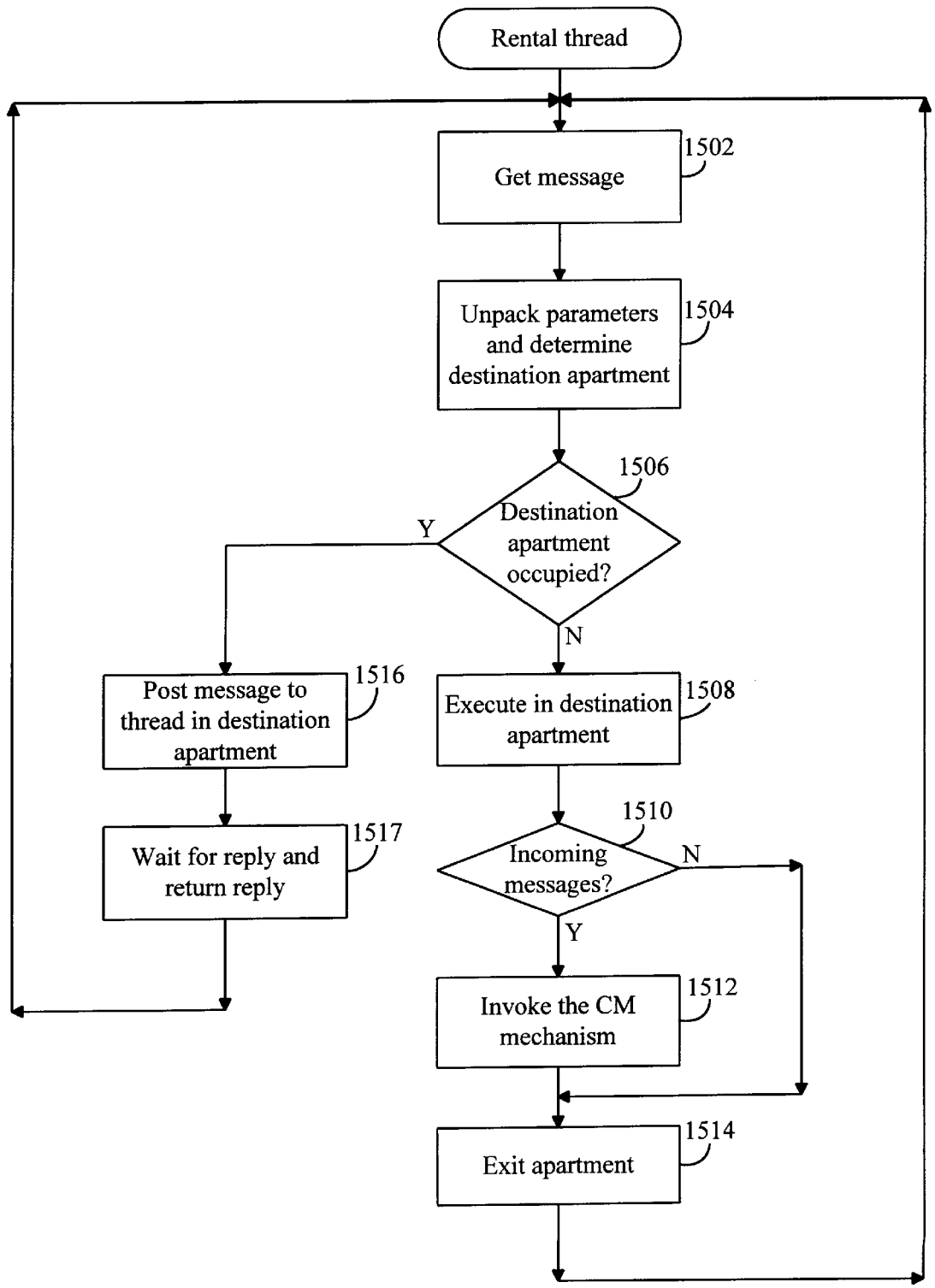
FIG. 15 depicts a flow chart of the steps performed by a thread of the rental model of the alternative embodiment of the present invention.

FIG. 15 depicts a flowchart of the steps performed by a thread utilizing the rental model. The processing described herein is applicable to threads and RPC inbound threads. That is, this processing is independent of the source of the message. The first step performed by the thread is to invoke the GetMessage routine (step 1502). After invoking the GetMessage routine, the thread unpacks the parameters and determines the destination apartment (step 1504). This step is performed by obtaining the object ID within the message and accessing the data structure within the shared memory. After determining the destination apartment, the thread determines if the destination apartment is occupied (step 1506). That is, in this step, the thread determines whether another thread is executing within the destination apartment. If the destination apartment is occupied, the thread posts the message to the occupying thread in the destination apartment (step 1516). The thread posts the message in this step so that the occupying thread receives the message when the occupying thread checks for incoming messages before exiting the apartment and then processes the message utilizing the CM mechanism. After posting the message, the thread waits for a reply from the occupying thread and returns the reply (step 1517). After returning the reply, the processing continues to step 1502 where the thread again invokes the GetMessage routine. If the destination apartment is unoccupied, the thread executes within the destination apartment (step 1508). In this step, the thread accesses the desired object invokes the appropriate methods on the object, and returns the results. After executing within the destination apartment, the thread determines whether it has received any incoming messages (step 1510). In this step, the thread examines the message queue to determine if it has received any messages. If the thread has received an incoming message, the thread invokes the CM mechanism (step 1512). In this step, the CM mechanism is invoked to determine whether the thread can process the incoming message. If it is determined that the thread can process the incoming message, the thread processes the incoming message. Otherwise, if the CM mechanism determines that the thread is unable to process the incoming message, the incoming message is rejected. If no incoming messages have been detected, or after invoking the CM mechanism, the thread exits the apartment (step 1514). At this point, the apartment is available for another thread to execute within it. After exiting the apartment, processing continues to step 1502 and the thread invokes the GetMessage routine.

While the present invention has been described with reference to a preferred embodiment thereof, those skilled in the art will know of various changes in form that may be made without departing from the spirit and scope of the claimed invention as defined in the appended claims.

What is claimed is:

1. In a computer system having a process with a plurality of threads, the process having an address space and shared data accessible by the threads within the address space of the process, at least two of the threads having a concurrency management component, each thread being a path of execution, one thread being a source thread and one thread being a destination thread, a method comprising:

providing a communication mechanism for each thread that has a concurrency management component;

sending a first communication containing a reference to data within the shared data from the source thread to the destination thread via the communication mechanism, said first communication requesting a reply from the destination thread to the source thread, wherein the sending includes providing semaphores to the shared data to serialize access to the shared data;

while the source thread is waiting for the reply to the first communication, receiving a second communication by the source thread; and processing the second communication by the concurrency management component to manage concurrency on behalf of the source thread so that concurrency problems do not arise while the source thread is waiting; and receiving the reply to the first communication from the destination thread.

2. In a computer system having a process including a plurality of objects, and shared data accessible by the objects, one object being a source object, a method comprising:

providing one or more apartments for partitioning the plurality of objects of the process, wherein a first apartment includes the source object;

providing a communication mechanism that has a concurrency management component for the first apartment;

sending a first communication from the source object to a destination object, said first communication requesting a reply from the destination object to the source object;

while the source object is waiting for the reply to the first communication, receiving a second communication by the source object; and processing the second communication by the concurrency management component to manage concurrency on behalf of the first apartment so that concurrency problems do not arise while the source object is waiting; and receiving the reply to the first communication from the destination object.

3. The method of claim 2 wherein the sending a first communication includes sending a first communication from the source object in the first apartment to the destination object in a second apartment.

4. The method of claim 2 wherein the plurality of objects of the process includes the destination object, wherein the first communication contains a reference to data within the shared data, and wherein the sending a first communication includes providing semaphores to the shared data to serialize access to the shared data.

5. The method of claim 2 wherein a second process includes the destination object, wherein the destination object has methods for performing operations, and wherein the sending a first communication includes sending a first communication containing a remote procedure call from the source object to the destination object, wherein the remote procedure call invokes a method of the destination object.

6. A data processing system comprising:

a process having a plurality of threads and a plurality of data organized into one or more sets;

a source thread in the process for operating upon data in a first set and for creating a first message involving data in the first set;

a destination thread for operating upon data in a second set and for receiving the first message from the source thread;

a transfer mechanism for transferring the first message from the source thread to the destination thread; and a first set-specific concurrency management component for processing a second message received by the source thread while the source thread waits for a reply to the first message from the destination thread;

wherein for each thread one or more objects encapsulate the data operated upon by the thread and wherein the transfer mechanism transfers a message from a source object accessible by the source thread to a destination object accessible by the destination thread.

7. The data processing system of claim 6 wherein the data processing system has a plurality of processes, wherein the source thread is in a first process and wherein the destination thread is in a second process.

8. The data processing system of claim 6 wherein the process further comprises shared data for maintaining data that is accessible by the threads and wherein the source thread accesses the shared data to determine a location of the destination thread.

9. The data processing system of claim 6 wherein the destination thread executes one or more procedures and wherein the first message contains a remote procedure call for invoking a procedure executable by the destination thread.

10. A data processing system having a process comprising:

a plurality of objects in one or more sets, wherein a source object in a first set is for generating a first communication and wherein a destination object is for receiving the first communication from the source object;

a shared data component for maintaining data accessible by the objects, wherein the first communication refers to data within the shared data component; and a communication mechanism for sending the first communication from the source object to the destination object, the communication mechanism further comprising:

a concurrency management component for executing when a second communication is received by the source object to manage concurrency on behalf of the first set so that concurrency problems do not arise while the source object awaits a reply to the first communication.

11. A method in a computer system for synchronizing access to data among multiple threads of a process, the method comprising:

designating one of the multiple threads as an apartment thread, the apartment thread for allocating data;

sending a message to the apartment thread from a thread other than the apartment thread, the message requesting that the apartment thread access the data on behalf of the other thread; and in response to receiving the sent message at the apartment thread, accessing by the apartment thread of the data wherein all accessing of the data is through the apartment thread.

12. The method of claim 11 including notifying the other thread when the apartment threads accesses the data.

13. The method of claim 11 wherein the other thread has a concurrency management component to manage concurrency on its behalf while it is waiting for a response to the sent message.

14. A method in a computer system for synchronizing access to an object among multiple threads of a process, the method comprising:

creating a plurality of threads;

under control of one of the created threads, instantiating the object by one of the threads; and accessing the object by requesting the thread that instantiated the object to access of the object on behalf of a requesting thread, and by, in response to the request, accessing the instantiated object by the thread that instantiated the object wherein all accessing of the object is through the thread that instantiated the object.

15. The method of claim 14 including notifying the requesting thread when the thread that instantiated the object accesses the object.

16. The method of claim 14 wherein the requesting thread has a concurrency management component to manage concurrency on its behalf while it is waiting for access to the object.

17. A computer system with partitioning of a plurality of objects in a process for multi-threaded processing, the computer system comprising:

a process comprising an address space and a plurality of objects, wherein an object comprises data and methods to operate upon the data;

a plurality of threads in the process; and one or more apartments for partitioning the plurality of objects, wherein each of the one or more apartments has an associated dedicated thread for executing to operate upon the data of objects in that apartment.

18. The computer system of claim 17 wherein an apartment handle identifies each of the one or more apartments, the computer system further comprising:

a data structure that for each of the plurality of objects maps an object identifier to an apartment handle in order to form an object to apartment association.

19. The computer system of claim 17 further comprising:
a communication mechanism for routing an object call to an appropriate apartment and thread for performing the object call.

20. The computer system of claim 17 wherein each of the plurality of threads is capable of accessing shared data in the process, wherein semaphores serialize access to the shared data, and wherein a communication between a first thread and a second thread includes a reference to data within the shared data.

21. The computer system of claim 17 wherein each of the one or more apartments has a concurrency management component that prevents deadlocks between the plurality of threads in the process.

22. In a computer system having a process that includes a plurality of objects, a method for serializing access to objects in the process based upon membership of the objects in an object set, the method comprising:
providing one or more object sets for partitioning a plurality of objects in a process, wherein a first object set includes one or more objects, and wherein an object comprises data and methods to operate upon the data;
providing a unit of execution associated with the first object set for executing the methods of the one or more objects of the first object set;
receiving plural operation requests directed to the one or more objects of the first object set; and
based upon membership of the one or more objects in the first object set, serializing execution of the requested operations by the unit of execution.

23. A data processing system comprising:
a process having a plurality of threads, a plurality of data organized into one or more sets, and shared data for maintaining data that is accessible by the threads, the shared data having semaphores for regulating access to the shared data;
a source thread in the process for operating upon data in a first set and for creating a first message involving data in the first set;
a destination thread for operating upon data in a second set and for receiving the first message from the source thread, the source thread accessing the shared data to determine a location of the destination thread;
a transfer mechanism for transferring the first message from the source thread to the destination thread; and
a first set-specific concurrency management component for processing a second message received by the source thread while the source thread waits for a reply to the first message from the destination thread.

24. A method in a computer system for synchronizing access to data among multiple threads of a process, wherein the data is an object, the method comprising:
designating one of the multiple threads as an apartment thread, the apartment thread for instantiating the object;
sending a message to the apartment thread from a thread other than the apartment thread, the message requesting that the apartment thread access the data on behalf of the other thread; and
in response to receiving the sent message at the apartment thread, accessing by the apartment thread of the data wherein all accessing of the data is through the apartment thread.

25. A computer system with organization of data in a process to segregate processing of the data between units of execution, the computer system comprising:
a process having a shared address space, shared data, and segregated data split into one or more segregated data sets;
for a first segregated data set, a first unit of execution for executing within the process to operate upon the data of the first segregated data set;
for a second segregated data set, a second unit of execution for executing within the process to operate upon the data of the second segregated data set;
a data structure that stores shared data in the shared address space, said shared data including a mapping of segregated data to a segregated data set that includes the segregated data;
for the first segregated data set, a first segregated data set concurrency management component for regulating access to the data of the first segregated data set; and
for the second segregated data set, a second segregated data set concurrency management component for regulating access to the data of the second segregated data set.

26. A computer system with organization of data in a process to segregate processing of the data between units of execution, the computer system comprising:
a process having a shared address space, shared data, and segregated data split into one or more segregated data sets;
for a first segregated data set, a first unit of execution for executing within the process to operate upon the data of the first segregated data set;
for a second segregated data set, a second unit of execution for executing within the process to operate upon the data of the second segregated data set; and
a data structure that stores shared data in the shared address space, said shared data including a mapping of segregated data to a segregated data set that includes the segregated data;
wherein for each segregated data set one or more objects encapsulate the data of the segregated data set, each of the one or more objects exposing methods for a unit of execution to operate upon the encapsulated data.

27. A computer system with organization of data in a process to segregate processing of the data between units of execution, the computer system comprising:
a process having a shared address space, shared data, and segregated data split into one or more segregated data sets;
for a first segregated data set, a first unit of execution for executing within the process to operate upon the data of the first segregated data set;
for a second segregated data set, a second unit of execution for executing within the process to operate upon the data of the second segregated data set; and
a data structure that stores first data of the shared data in the shared address space, said first data including a mapping of segregated data to a segregated data set that includes the segregated data;
wherein each unit of execution is capable of accessing the shared data, and wherein a communication between units of execution includes a reference to second data within the shared data.

* * * * *